United States Patent [19]

Michael

[11] 4,334,245

[45] Jun. 8, 1982

[54] T.V. SPECIAL EFFECTS GENERATOR

[75] Inventor: Peter C. Michael, Newbury, England

[73] Assignee: Micro Consultants Limited, Berkshire, England

[21] Appl. No.: 181,500

[22] Filed: Aug. 26, 1980

Related U.S. Application Data

[63] Continuation-in-part of Ser. No. 886,017, Mar. 13, 1978, abandoned.

[30] Foreign Application Priority Data

Mar. 17, 1977 [GB] United Kingdom ............... 11361/77

[51] Int. Cl.³ .............................................. H04N 5/22
[52] U.S. Cl. ..................................... 358/183; 358/180
[58] Field of Search ................. 358/22, 182, 183, 180, 358/185

[56] References Cited

U.S. PATENT DOCUMENTS 3,821,468  6/1974  Busch ................................... 358/183

Primary Examiner—Robert L. Richardson
Attorney, Agent, or Firm—Dowell & Dowell

[57] ABSTRACT

A T.V. special effects generator which includes a store for a video image and a coefficient processor connected to the store which synthesises picture points from the stored video image to provide a processed image which has a shape dependent on mask data controlling this picture point synthesis which results in an image distorted into the desired shape to give a fish-eye effect for example. The mask data may be generated in a computer or by using a T.V. camera and the processed mask information may be used as the key input in a studio mixer. Additional control of the size of the image can be effected to provide picture zoom.

29 Claims, 9 Drawing Figures

T.V. SPECIAL EFFECTS GENERATOR

This is a continuation-in-part application to Ser. No. 886,017 filed Mar. 13, 1978, now abandoned.

BACKGROUND TO THE INVENTION

The invention relates to T.V. special effects generation and more particularly to the production of special television effects using digital techniques.

There is a continuing requirement for electronic special effects generation for use on air or on post production within the television environment.

A processor has already been described in U.S. Pat. No. 4,163,249 which is capable of altering the linear dimensions of the television picture to effect a 'zoom' in or out of the picture in real time. This allows the rectangular picture to be made into a smaller or bigger rectangle relative to the normal frame size.

The present invention incorporates a modification of the processing system of the above to allow for a change in linear dimensions as the subject matter is zoomed.

This effect is intended to allow a rectangular picture to be zoomed to a picture with dimensions not necessarily linearly related to the original rectangle. For example, the standard television picture could be zoomed to a smaller circular picture, similar to that produced by a 'fish eye' lens.

The invention is not concerned merely with symmetrical shapes such as circular pictures and the system to be described is such that irregular patterns may be used as the zoomed shape, thus giving the ability to effectively turn one subject into another.

These effects themselves are known and are used already in the film industry and forms the basis of film production facilities for 'credits' and background material.

The way in which these effects were previously produced was by means of for example a digital computer and a slow scan display system. In this prior art case the effect is produced on a frame by frame basis slowly and photographed at each step. Such an arrangement utilising photography on a frame by frame basis is relatively slow and not particularly suited to the television art.

OBJECT OF THE INVENTION

An object of the invention is to provide a system where the operation is undertaken in real time and the output may be consequently substantially simultaneously transmitted or alternatively video taped.

SUMMARY OF THE INVENTION

According to the invention there is provided a television special effects generator comprising: video image storage means for storing a video image; mask data means for providing mask shape information representative of a masking shape; and coefficient processing means for receiving and processing the stored video image to provide an image of modified shape comprised of a plurality of picture points each synthesised from adjacent picture point information in dependence on masking shape information provided by said mask data means.

BRIEF DESCRIPTION OF THE DRAWINGS

The invention will now be described by way of example with reference to the accompanying drawings in which.

DESCRIPTION OF PREFERRED EMBODIMENT

Figure 1:
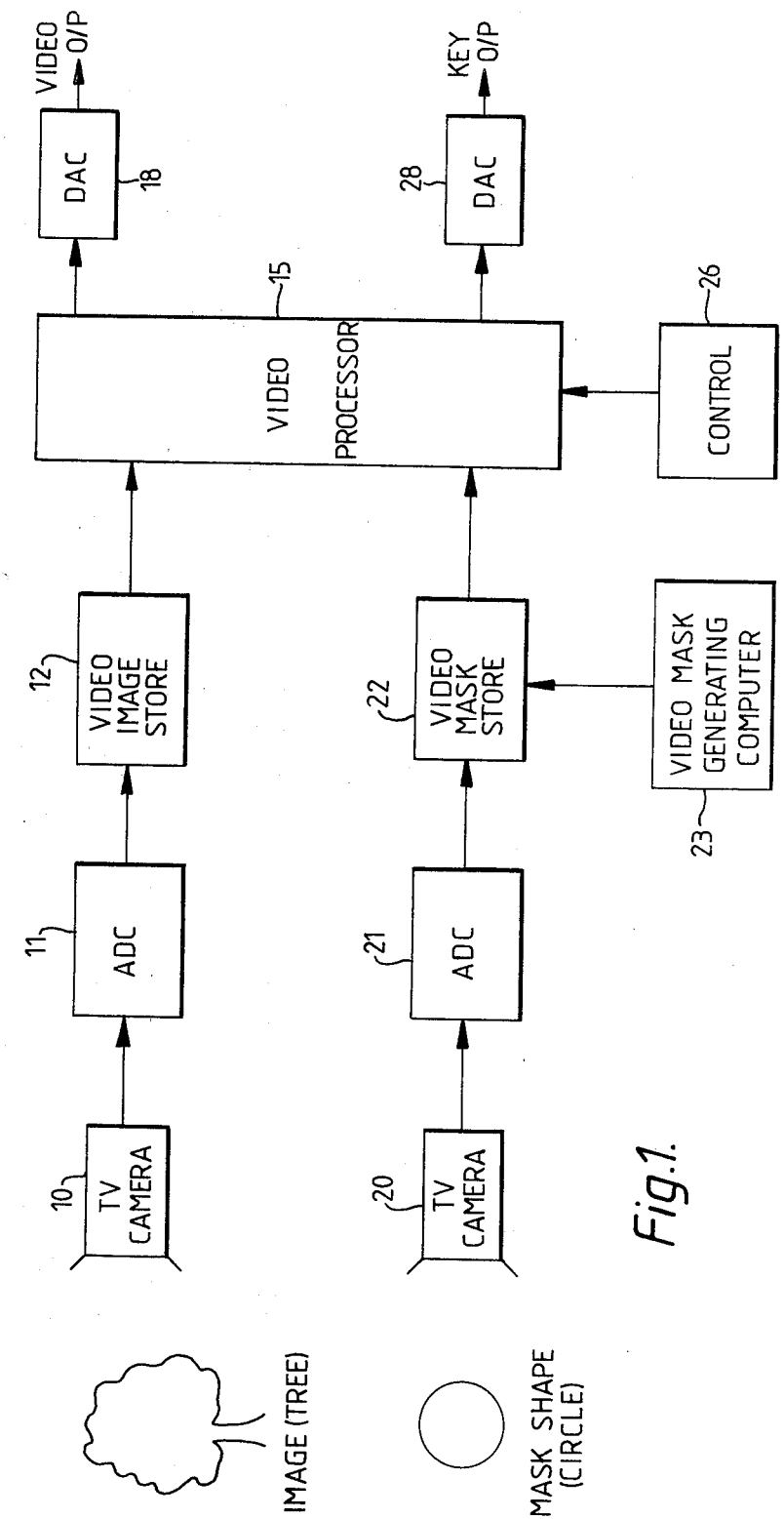
FIG. 1 shows the special effects generation system of the invention.

In FIG. 1 an embodiment of the video effects generator is shown.

The normal video image (e.g. a tree as shown) is received by a T.V. camera 10. The image is converted into digital form by an analogue to digital converter (ADC) 11 in known manner and received by a video image store 12. The stored image is accessible to a video processor 15 to be described in more detail below. The processed image is typically reconverted into analogue form by digital to analogue converter (DAC) 18.

A second image path is provided by camera 20 which receives the image of a required mask shape (e.g. a circular mask as shown). The image information is converted into digital form by ADC 21 (which may simply comprise a slicer when the mask image is provided as a silhouette to give single bit resolution). The mask image data is stored in mask data store 22, which can be accessed by video processor 15. The processed mask data is used as a standard key output signal (via DAC 28) for the studio mixing console (not shown) and the video output from DAC 18 provides the modified image.

Instead of the mask shape being generated via the camera 20, alternatively the mask may be generated by means of a computer 23 (e.g. PDP 11) interfaced to the mask store 22. In the case of symmetrical shapes such as a circle it is necessary only to define a single quadrant via computer 23 for example. Thus the image from video store 12 is effectively processed by processor 15 on a line by line basis to give a defined degree of comparison (zoom down) for each line of the image from store 12 as defined by the mask data from data store 22 as described in more detail below. In the case of the circular image the upper lines of the picture will be more compressed than the central lines and the lower lines will also be more compressed than the central lines, so that a fish eye lens effect will be produced following processing.

Although the computer can be used to define the mask shape simply by the operator indicating the presence or absence of the mask for each picture point using x and y coordinates for each picture point, with a circle it is possible to merely define the coordinates for its centre and define the length of radius (or diameter) and using known algebraic equations it is possible for the computer to automatically calculate the two points which will touch the circumference for any given video line which will effectively be used to define the degree of compression applied to the video data for that particular line. Such techniques can be used for other shapes e.g. an ellipse. In addition the size of the image relative to normal frame size can be changed to provide zoom up or down whilst retaining the shape defined by the mask data.

This zoom up or down of the images via processor 15 is controlled by zoom control 26.

The converters 11, 21 and 18, 28 are standard items used in digital video systems and are therefore not described further.

The video image store 12 contains the standard picture as received but stored in digital format. The store will typically comprise random access memory devices with a storage capacity of at least five hundred points horizontally by five hundred lines vertically giving a total of at least 250,000 locations. Each location will have a resolution of 8 digital bits equivalent to 256 grey levels.

An image store of this sort is already known from U.S. Pat. No. 4,183,058 and three such stores are needed to operate in red, green and blue.

In order to economise in storage and bearing in mind the known frequency limitation of the colour information in a television format it is more common to use a reduced storage capacity for the colour difference signals which are known as I and Q for NTSC signals or U and V for PAL signals.

The mask data store 22 typically will also have five hundred points horizontally by five hundred lines vertically giving a total of 250,000 points. However, each point has a resolution of only two bits. This is sufficient to define the mask information provided via camera 20 and ADC 21. Indeed it would be possible to use only 1 bit to indicate the presence or absence of the mask at any picture point (as already mentioned).

As explained above the mask may alternatively be produced by the computer 23. Interfacing and operation of a computer with a frame store is known from U.S. Pat. No. 4,148,070. To derive the mask using the computer it is only necessary to define the location of a particular picture point and determine whether this falls within or outside the mask area using one of the methods described above.

Thus the mask data store 22 contains a pattern of noughts and ones which defines the shape of the end point zoom. For example, the video mask may contain a circular pattern of noughts and ones. This pattern can be loaded from the digital computer 23.

In another example, the mask data store 22 may contain the silhouette of a horse. In this case the image will typically have been loaded from the television camera 20 aligned with an artist's impression of the required silhouette, and the image produced at the output of processor 15 will be distorted into the horse shape.

The video mask data is also responsible for producing the 'key' output from the digital special effects machine. The key output is connected usually to a standard television mixing console which is capable of switching from one source to another under the command of the key signal. Switching under the control of a 'key' signal is a standard T.V. function for such a mixer.

If the video mask store contains a circular image for example and the key signal is enabled, then the image seen at the output of the video mixer will be the processed television image masked and distorted into the form of a circle. A second image may be inserted either around the outside of the circle or alternatively in the centre of the circle as selected by the mixer switching.

The heart of the special effects generator is video processor 15 and associated control 26 capable of taking both the video image in store 12 and the video mask data in store 22 and manipulating the image output.

The basic image manipulation is an alteration of linear dimensions using techniques as disclosed in the aforementioned U.S. Pat. No. 4,163,249.

In order to alter linear dimensions horizontal and vertical interpolation techniques are used. The video processor computes in real time the information needed to produce an image of a different size using the information already contained in the image store 12.

Figure 2:
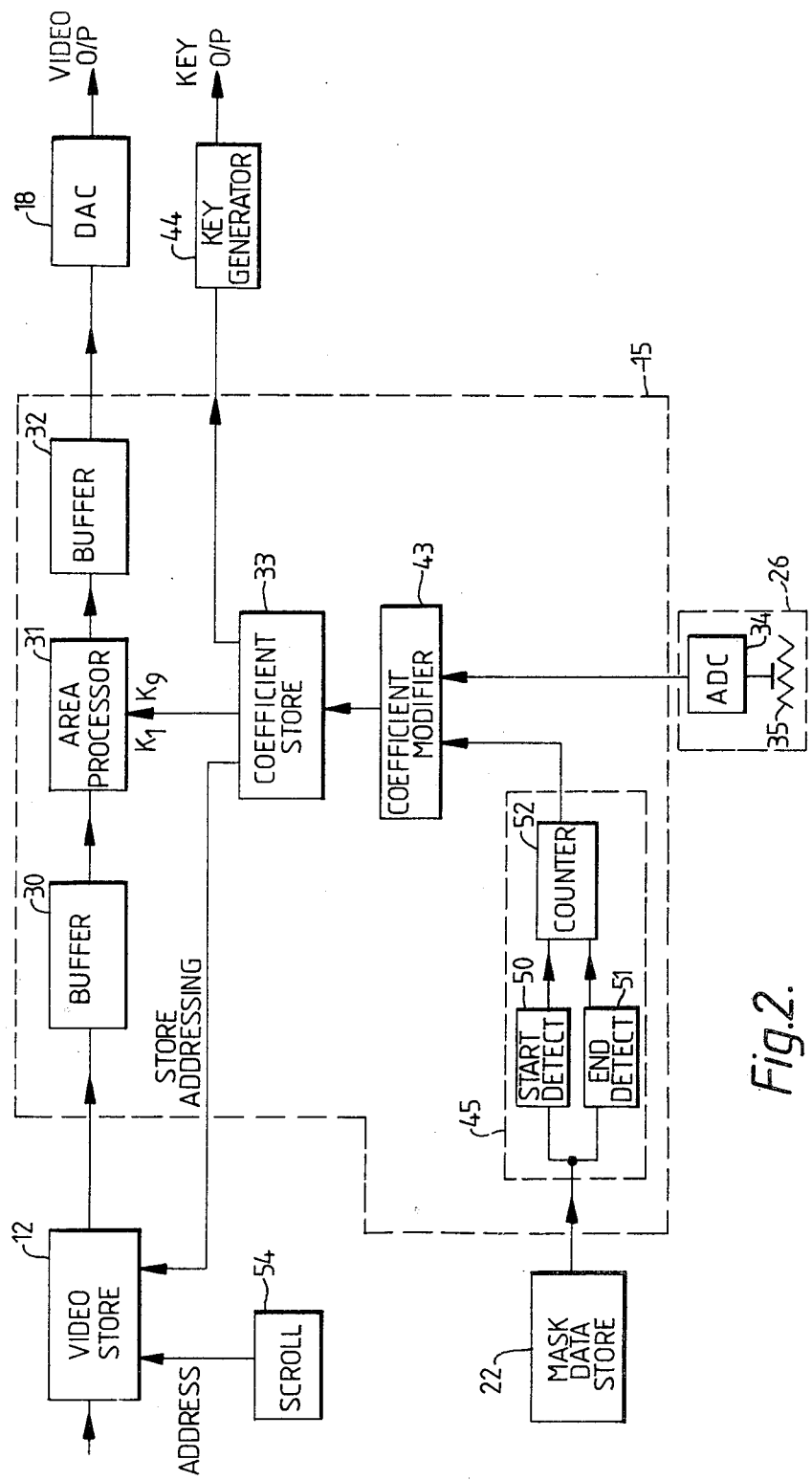
FIG. 2 shows an embodiment of the image processing arrangement together with the linear compression and expansion control in more detail.
Figure 3:
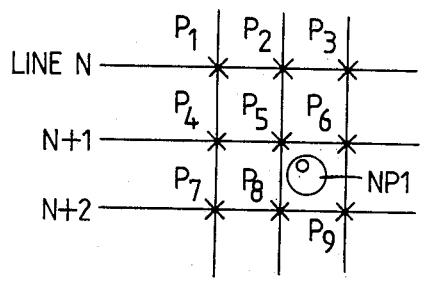
FIG. 3 shows the area processing function of the FIG. 2 arrangement.

A way in which this can be effected is now described with reference to FIG. 2. The data from image store 12 is received by buffer formatter 30 which is connected to area processor 31. Formatter 30 is basically a buffer store which reformats the data for application to the area processor. For expansion or compression of the picture, the area processor 31 synthesizes a new picture point from the information within a given area (see FIG. 3). The new picture point (NP1) is calculated from nine surrounding picture points in this example. Successive picture points P1 to P9 on adjacent lines N, N+1 and N+2 are applied to the area processor via formatter 30. Each of the points P1 through P9 is modified by coefficient K1 through K9. The resultant sum is a new picture point designated NP1 where $$NP1 = K1P1 + K3P3 \ldots \text{etc through } K9P9.$$

When calculating the next picture point NP2 (say) the values of coefficients K1 to K9 for this new area will be different to those for the first area thus $$NP1 = K1A\ P1 + K2A\ P2 + K3A\ P3 + \ldots K9A\ P9$$

$$NP2 = K1B\ P2 + K2B\ P3 + K3B\ P10 + \ldots K9B\ P12$$

where P10, 11 and 12 are the next picture points on lines N, N+1, N+2 respectively. Thus the area process remains the same but the coefficients K1 through K9 are variable.

The operation of area interpolation occurs in real time and as the data represents incoming information scanned horizontally the coefficients K1 through K9 change across the length of 1 television line, the switch occurring between picture points. In the same way vertically the boundaries between the lines represent coefficient changes. Thus for compression, the number of new picture points produced will be less than the original number of new picture points but each new picture point will be derived from data on the nearest 9 picture points. For expansion the number of new picture points produced will be greater than the original number.

The coefficients K1 through K9 are stored in a separate coefficient storage unit 33 and outputted dependent on the degree of compression or expansion required. In addition the store 33 provides addressing data for the video store 12 dependent on the degree of compression/expansion to select P1 to P9 for example.

Figure 4:
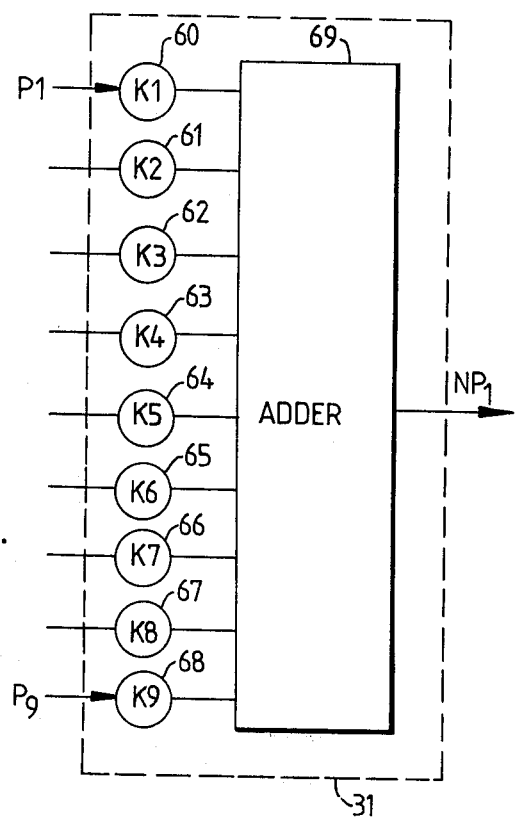
FIG. 4 shows a known area processing arrangement.

The area processor 31 is shown in more detail in FIG. 4. Multipliers 60-68 each receive data on one picture point (P1-P9) and multiply the data by coefficients K1 to K9 respectively, which coefficients will each be variable but preset. The modified data is added in adder 69 which comprises a 9 input×8 bit adder. The output from adder 69 will be the new picture point NP1.

The coefficient multiplier function of area processor 31 (i.e. multipliers 60-68) can be effected by using known random access memories (RAM), (e.g. 8×256 bit capacity). The coefficients K1 to K9 are loaded into the store locations within the RAM during a write cycle. The coefficient data from the coefficient store 33 is applied to the RAM data input and the location to which data is written in is determined by its store address data input. Address data is applied in the normal way to the address input. During operation as a multiplier (i.e. read cycle) the incoming video data is applied to the RAM 'address' terminals. The RAM has sufficient addresses so that each input number identifies one particular location within the store. Thus as each location has a preloaded coefficient stored therein when a particular location is accessed (i.e. in dependence on the incoming data which effectively defines the address), the data stored in a particular location is read out from the RAM. This data will either be an 0 or I depending on the predetermined coefficient. Thus the 8 bit input data for picture point P1 will effectively be multiplied by a coefficient K1.

Thus each coefficient K1-K9 'looked-up' from store 33 is different for each picture point and in addition each coefficient will be different for each size of compression or expansion selected.

The output from area processor 31 is received by output buffer store 32 which rearranges the information so that it appears in the time scale necessary for the DAC 18. The above basic compression/expansion mechanism of the video image together with modifications thereof is already known from U.S. Pat. No. 4,163,249.

In the present invention however the area processing is not only dependent on the linear expansion or compression determined by the setting of control 26 but also on the mask shape and is effectively changeable on a line by line basis rather than field or frame basis.

The shape and size of the processed picture relative to normal frame size is determined by the input to coefficient store 33 provided via the coefficient modifier block 43 which input is dependent both on the mask data from store 22 and the setting of zoom control 26. The required degree of compression or expansion relative to normal frame size is manually controlled by an analogue type control 35 within block 26. This analogue value is converted into a digital number in an analogue to digital converter 34 and applied to the coefficient modifier 43 so that the required values of K1 through K9 (together with appropriate addressing commands) are extracted for each setting of the compression control for use in the area processor 31 dependent also on current mask data.

As explained above for a normal rectangular picture (from image store 12) a new picture point is calculated from several picture points within a selected area. For any particular one of those picture points, the horizontal coefficient applied will be fixed for a particular image size (assuming no modification via modifier 43). Thus if a different image size is selected the horizontal coefficient will have a different value for the same picture point.

In a similar way, the vertical coefficient for a particular picture point within a given area will have a fixed value for a given image size.

With a non-rectangular image however (e.g. a circle) held in the mask store each picture point of the image from store 12 may be subject to a different coefficient value from coefficient store 33 dependent on the received mask data via key detector 45 to provide the required compression or expansion on a line by line basis and the input to store 33 is a data word similar to that produced from zoom control 26 but likely to be varying on a line by line basis as determined by detector block 45. Detector 45 can comprise a key detector of the type disclosed in British patent publication No. 2,013,448 (U.S. Pat. No. 4,240,104) and operating on a line by line basis to give an output dependent on the presence of the key for that particular line, as described in more detail below.

Thus typically the detector 45 will detect the presence of the chroma key (only present during that part of the picture defining the mask shape) and compute the degree of compression line by line to achieve such a shape by squeezing the picture to exactly fit the dimensions required.

Figure 5:
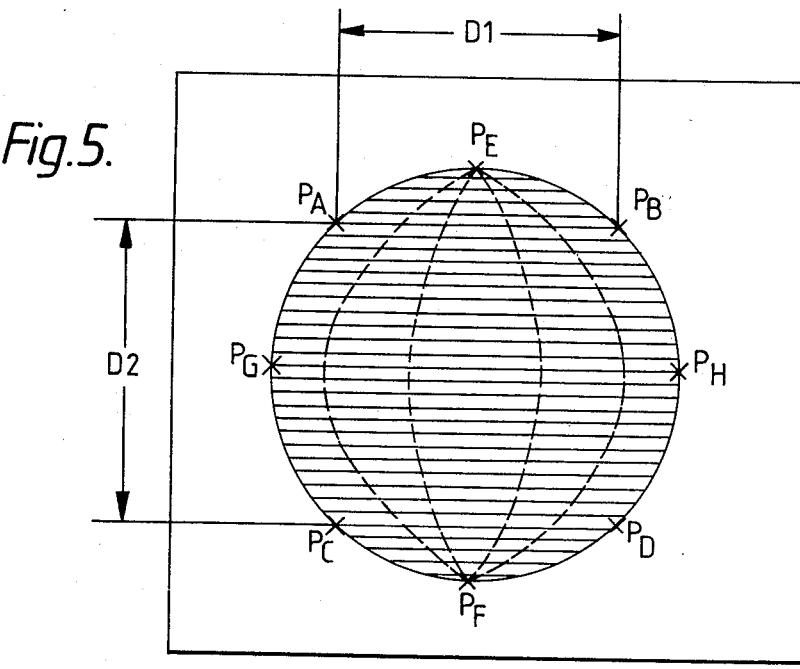
FIG. 5 shows computation for a circular picture.

FIG. 5 shows the basis of the computation needed in order to compress a rectangular picture into a circular picture as held in the mask store. Points PA and PB lie on the same line whilst points PC and PC lie on a different line further down the picture. Point PA lies vertically above point PC whilst point PB lies vertically above PD.

Consider first the information the processor needs in order to compress the rectangular image into the circle with line by line alteration of the instantaneous horizontal compression coefficient. In this example the vertical compression will remain constant as (PF−PE)/525. Expressed as a percentage of the full line width the coefficient for horizontal compression is distance D1 over 52 (the number of active microseconds in a line) where D1 is the number of microseconds lying between point PA and PB.

The above expressions make the assumption that the horizontal line length of 64 microseconds and the number of television lines in the system under discussion is 525.

Given the contents of the mask data store 22 which lie at either zero or 1 over every part of the picture area, the computation involves a simple subtraction of two numbers which are the addresses of points PA and PB then dividing by a fixed coefficient. In one of the embodiments the digital computer 23 undertakes the calculation as a simple software operation. It is clear from the example given that the horizontal compression coefficients alter from line to line if a non-rectangular picture is to be generated. The basis of the computation may however always be extrapolated from the example given above with the addition of logic rules for shapes which are re-entry and which contain more than two points on each line horizontally. As shown in simplified block form the detector 45 includes a start of key detector 50 and end of key detector 51 controlling picture point counter 52. Thus looking at FIG. 5, considering the line which contains points PA and PB, the start detector 50 will trigger the counter 52 at PA and the number of picture points are counted till the counter is stopped on reaching point PB as detected by end detector 51. The counter value is effectively the 'length' of image D1 for that line and relative to normal frame size will define the degree of compression required for that line. The counter output can be used to access the coefficient store 33 via modifier 43.

The output of detector 45 effectively controls the coefficient accessed from store 33 for a given picture size. This coefficient will be modified in coefficient modifier 43 should the rectangular size of the image be chosen to be other than normal frame size (as determined by the setting of control 26). Such coefficient modification is known from U.S. Pat. No. 4,163,249. The horizontal size component (see FIG. 5) will comprise $$\frac{PB - PA}{\text{line length}}$$

effectively shifted down to the line associated with point PE. The horizontal size component will be changing line by line although in this example the vertical size component is typically fixed for the entire picture.

Although data store 22 has been described as a frame store with a plurality of picture points corresponding in construction to the store 12, in a modification to this arrangement where the data is generated purely by computer, it is possible to use a data store comprising a look up table where values of D1 and D2 are stored and accessed on a line by line basis to select the degree of compression for a particular line, and this would not require the large capacity corresponding to the number of picture points as in the former system.

The key output for the switcher is provided by key generator 44 which provides a key signal indicative of the presence of the modified mask data during the relevent parts of the video frame. This key generator can simply take the coefficient data and convert this digital number into an analogue keying voltage whenever this digital number is higher than zero (i.e. indicative of the presence of an image at that particular picture point). This effectively performs the ADC function of block 25 of FIG. 1.

A scroll facility is provided by control 54. This modifies the store addressing by increasing or decreasing by one or more lines using known techniques (see U.S. Pat. No. 4,148,070 for example) to cause the video data in store 12 to be slowly moved up or down therein.

Although the example given concerning FIG. 5 has been discussed as changing only the horizontal size component line by line whilst keeping the vertical component constant, in an alternative arrangement the vertical component could also be changed.

Consider now the example of FIG. 5 but with vertical compression changes as well as horizontal. The horizontal manipulation stays as before but now if the illusion of a 'fish eye' lens is to be even more realistically created then the vertical compression ratio on the top of the picture (PE) must be high, tending to unity at the middle (line PG, PH), and returning to being high at the bottom PF. Now unlike a genuine optical fish eye lens there is not an infinite amount of position information to process since we only have the original rectangular image and no more.

In other words, the information in the normal rectangular image has to be used to synthesise the circular image. With a fish eye lens parts of a scene will be captured by this lens especially at the top and bottom of the field of view which will not be present in the rectangular image. Thus to give the necessary illusion, the vertical compression coefficients are selected so that the degree of compression is such that the synthesis is achieved without running out of available data at the bottom of the picture (around point PF). In practice the coefficients are selected by experiment and entered into coefficient store 33 for later access. The computer can be called upon to generate the desired coefficients.

Figure 6A:
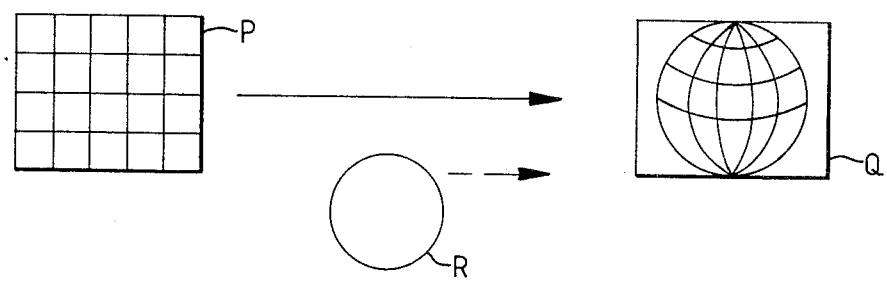
FIGS. 6a and 6b show various processed images.

Thus the various embodiments of the system can be used to transform the rectangular image into any one of a plurality of shapes merely by defining that shape in some way (via the computer 23 or using the television camera 20 of FIG. 1). The computer can have the capability of generating a number of mask shapes and one of these can be selected as desired. If a circular mask is used the image is transformed as in FIG. 6a from image P to that shown in Q. (The grid of lines is included for illustrative purposes to show the image distortion produced and the horizontal grid lines of image P are seen distorted in Q, this being the affect when the vertical compression is changing in addition to the horizontal component (see FIG. 5 for comparison).) The controlling mask shape is shown represented as R.

Figure 6B:
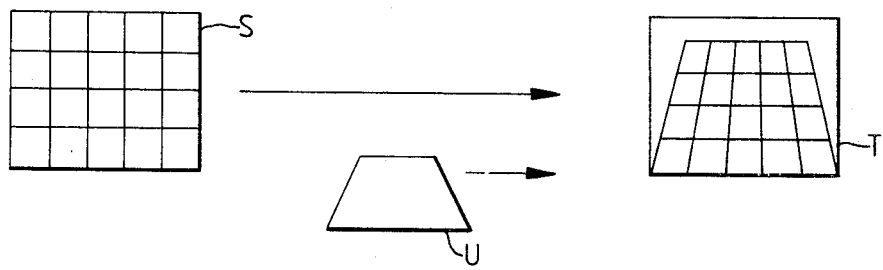

By selecting other shapes, perspective variations can be achieved as shown in FIG. 6b.

Here image S is transformed to image T using mask shape U. Such a shape gives the illusion of the picture disappearing into the distance and is particularly useful for tilting or captions. By incorporating scrolling into the system it is possible to cause such tilting to appear to move away backwards from the front of the screen and be replaced by new picture material. Reversal of the scrolling will cause the new material to replace that of the most compressed data and gradually appear to zoom up towards the viewer. These shapes are described merely as examples and many others could be used such as a triangle, diamond or a completely customized shape.

Figure 7:
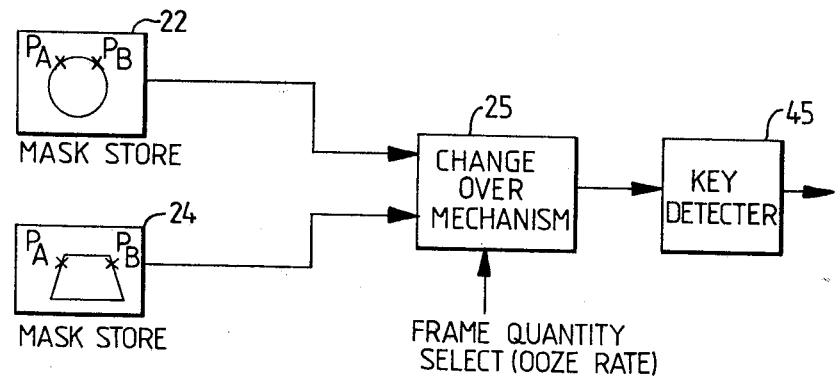
FIG. 7 shows a mechanism for changing from one mask to another.

In a modification to the basic system, it is possible by including more than one mask store to change gradually from one shape to another so that variations between the two mask shapes are achieved on the way giving an 'ooze' effect. The modification is shown in FIG. 7 and includes mask data stores 22 and 24, and change over mechanism 25. The output of change over mechanism 25 is typically received by key detector 45 for handling as in the FIG. 2 arrangement. Considering the line containing points PA and PB then comparing the representation for the circle in store 22 for that line with the trapezoid of store 24 for the equivalent line shows that changing from the circle to the trapezoid will require a reduction in the degree of compression and this reduction can be selected to occur over a predetermined number of frames, say 100.

Thus the portion of information from store 22 will gradually be reduced whilst the information from 24 will be gradually increased for the calculation.

The proportions can be computed by using the expression below such that the output at any frame is equivalent to:

$$\frac{\text{Present}}{\text{frame no.}} \cdot \frac{(\text{Data from store 24} - \text{Data from store 22})}{\text{Number of desired frames for change over}} + \text{Data from store 22}$$

Thus at the start of the change over (Frame No. 0) PA = PA in store 22

For Frame No. 1

$$PA = \frac{(PA \text{ in store 24} - PA \text{ in store 22})}{100} + PA \text{ in store 22}$$

For Frame No. 2

$$PA = \frac{2(PA \text{ in store } 24 - PA \text{ in store } 22)}{100} + PA \text{ in store } 22$$

and so on.

For Frame No. 100

$$PA = \frac{100(PA \text{ in store } 24 - PA \text{ in store } 22)}{100} + PA \text{ in store } 22$$

$$= PA \text{ in store } 24.$$

Thus the entire change over is computed in this manner to provide the desired information to be used to provide the mask shape.

Figure 8:
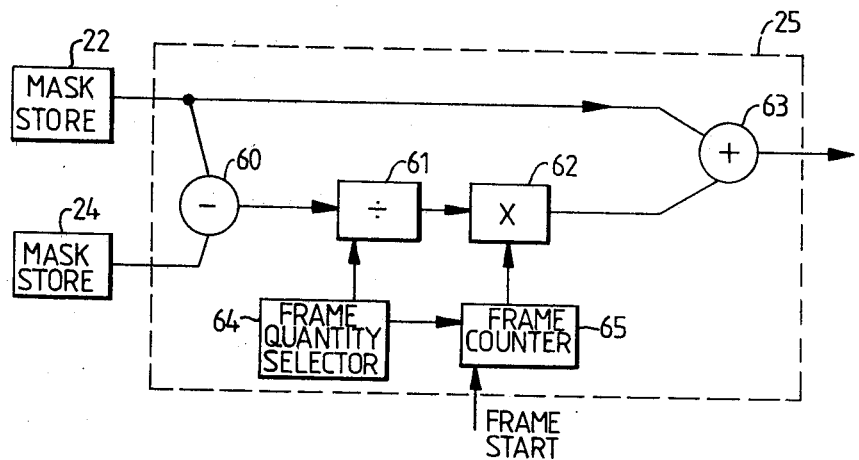
FIG. 8 shows this mechanism in more detail.

An arrangement for realising the change over mechanism 25 is shown in more detail in FIG. 8. A subtractor 60 provides the difference value which is then divided in divider 61 by the number of frames selected to occur during the change over (e.g. 100). The selector 64 can comprise standard BCD switches. The multiplier 62 multiplies the divider output by the number of frames which have occurred so far during change over. This number is available from frame counter 65 which will be updated at each frame. The start of the frame is identification available from the standard synchronising video information. The multiplier output is added in adder 63 with the information made available from mask store 22.

The system can operate in this way whatever the relative shapes of the masks are available.

Although the change over has been discussed as being fully completed from one mask shape in store 22 to another in store 24 it is also possible by inhibiting the frame update to counter 65 to effectively stop the change over somewhere between the original mask shape and that sought from store 24. This allows another shape to be used continuously which differs from that in either mask store 22 or 24. By providing a feedback path to the mask stores this could be entered as the new mask for storage and further use as required. Additional mask stores could be provided, and a complete library of various mask shapes could be generated and stored in this way.

I claim:

1. A television special effects generator comprising: video image storage means for storing a video image; mask data means for providing mask shape information representative of a masking shape; and coefficient processing means for receiving and processing the stored video image to provide an image of modified shape comprised of a plurality of picture points each synthesised from adjacent picture point information in dependence on masking shape information provided by said mask data means.

2. A generator according to claim 1, wherein the mask data means comprises a picture source representative of said mask derived from a video camera cooperating with a visual representation of the desired mask shape.

3. A generator according to claim 1, wherein the mask data means comprises a computer for generating the desired mask data.

4. A generator according to claim 1, including mask storage means for storing the provided mask shape information received from said mask data means.

5. A generator according to claim 1, including variable control means connected to said coefficient processing means to provide variation in the size of the processed image relative to normal frame size.

6. A generator according to claim 4, wherein the image storage means comprises a digital store and the mask data storage means comprises a digital data store for holding data on the desired mask dimensions.

7. A generator according to claim 4, wherein the image storage means and mask data storage means each comprise a digital picture store.

8. A generator according to claim 7, wherein an analogue to digital converter is provided to convert an analogue video signal into digital form prior to receipt by the digital stores.

9. A generator according to claim 7, wherein the video mask data in said mask data storage means is generated by means of a computer connected to said store.

10. A generator according to claim 1, wherein the coefficient processing means include a coefficient store for storing different coefficients to modify the picture dimensions in dependence on the coefficients selected according to the mask image information.

11. A generator according to claim 10, wherein a coefficient modifier is provided for modifying the information derived from said mask data means to effect a change in size of the processed video image by modifying the coefficients selected from said coefficient store.

12. A generator according to claim 11, wherein variable control means are provided connected to the coefficient modifier to allow selective size change of the processed image to be obtained.

13. A generator according to claim 12, wherein the variable control means is connected to the coefficient modifier via an analogue to digital converter.

14. A generator according to claim 1, wherein generator means are provided to generate a key output dependent on mask image data derived from said processing means for use in a mixer.

15. A generator according to claim 14, wherein the generator means includes a digital to analogue converter.

16. A generator according to claim 1, wherein detector means are provided to detect the presence of the mask shape information in the form of a keying signal to control the coefficient processing means.

17. A generator according to claim 15, wherein the detector means includes a counter for determining the period for which the keying signal is present on a line by line basis.

18. A generator according to claim 1, wherein scrolling means are provided to effect scrolling of the video image stored in the storage means.

19. A generator according to claim 5, wherein the computer is adapted to generate data on one of a plurality of masks stored therein.

20. A generator according to claim 1, including first masks storage means for storing the provided mask shape information for a first mask shape, second mask storage means for storing mask shape information for a second mask shape and change over means for providing a gradual change over from the first to the second mask shape in a predetermined period.

21. A generator according to claim 20, including selector means coupled to said change over means for selecting the period to effect complete change over.

22. A generator according to claim 21, wherein the change over means includes a subtractor for receiving the information from the first and second mask storage means, a divider for dividing the subtracted output by the number of frames designated by said selector means, a multiplier for multiplying the divided output by the number of frames which have occurred in the sequence, and an adder for adding the multiplier output with the information from the first mask storage means.

23. A method of generating television special effects comprising:

storing an incoming video image;

providing mask shape information representative of a desired masking shape; and processing the stored video image to provide an image of modified shape comprised of a plurality of picture points each synthesised from adjacent picture point information in dependence on the masking shape information provided.

24. A method according to claim 23, wherein the mask shape information is derived from a video camera cooperating with a visual representation of the desired mask shape.

25. A method according to claim 23, wherein the mask shape information is derived from a computer for generating the desired mask data.

26. A method according to claim 23, including the step of variably controlling the processing to provide selective variation in the size of the processed image relative to normal frame size.

27. A method according to claim 23, wherein mask shape information representative of two desired masking shapes is provided and gradual change over from one to the other of said shapes is effected in a predetermined period.

28. A method according to claim 27, including the step of selecting the period for the change over to be effected.

29. A method according to claim 28, wherein the change over step includes calculating any difference between the information entering the two mask shapes, dividing the difference by the number of frames required to occur in the selected change over period and multiplying the divided output by the number of frames which have occurred during the change over period and adding the result to information on the first mask shape.

* * * * *